United States Patent
Matsute et al.

(10) Patent No.: US 6,172,726 B1
(45) Date of Patent: *Jan. 9, 2001

(54) REFLECTION TYPE LIQUID CRYSTAL DISPLAY DEVICE IN WHICH PIXEL ELECTRODES HAVE SURFACE IRREGULARITIES DUE TO DISPOSAL OVER SWITCHING ELEMENTS

(75) Inventors: Masataka Matsute; Seiichi Arakawa, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/146,358

(22) Filed: Sep. 3, 1998

(30) Foreign Application Priority Data

Sep. 4, 1997 (JP) .................................... 9-239856

(51) Int. Cl.[7] .................................................. G02F 1/1335
(52) U.S. Cl. ............................................................ 349/113
(58) Field of Search ................................ 349/178, 112, 349/113

(56) References Cited

U.S. PATENT DOCUMENTS

| 4,405,210 | * | 9/1983 | Baur et al. | 349/178 |
| 4,883,343 | * | 11/1989 | Teshirogi | 349/112 |
| 5,500,750 | * | 3/1996 | Kanbe et al. | 349/113 |
| 5,526,149 | * | 6/1996 | Kanbe et al. | 349/113 |
| 5,684,551 | * | 11/1997 | Nakamura et al. | 349/113 |
| 5,805,252 | * | 9/1998 | Shimada et al. | 349/113 |
| 6,049,132 | * | 4/2000 | Iwahashi et al. | 349/113 |

* cited by examiner

Primary Examiner—Walter J. Malinowski
(74) Attorney, Agent, or Firm—Sonnneschein, Nath & Rosenthal

(57) ABSTRACT

A liquid crystal display device in which low power consumption and bright white color display are enabled to achieve high contrast as well as a response speed and picture quality compatible with a moving picture. A transparent substrate having a transparent electrode and a polarizing plate and a facing side substrate having plural pixel electrodes formed of a light reflective material and plural switching elements driving these pixel electrodes are arranged at a predetermined separation so that the transparent electrode and the pixel electrodes face each other. A liquid crystal layer formed of a nematic liquid crystal is interposed between the transparent substrate and the facing side substrate. The nematic liquid crystal is preferably a negative type nematic liquid crystal having negative anisotropy. The surfaces of the plural pixel electrodes towards the liquid crystal layer preferably present surface irregularities. If the surfaces of the pixel electrodes towards the liquid crystal are not irregular surfaces, the transparent substrate preferably has a light-scattering layer. A color filter is preferably provided on the transparent substrate or on the facing side substrate.

12 Claims, 4 Drawing Sheets

REFLECTION TYPE LIQUID CRYSTAL DISPLAY DEVICE IN WHICH PIXEL ELECTRODES HAVE SURFACE IRREGULARITIES DUE TO DISPOSAL OVER SWITCHING ELEMENTS

BACKGROUND OF THE INVENTION

1. Field of the Invention

This invention relates to a reflection type liquid crystal display device. More particularly, it relates to a reflection type liquid crystal display device of low power consumption employing a sole polarizer plate and which is capable of achieving high picture quality and high response characteristics.

2. Description of the Related Art

A liquid crystal display device (LCD) is lightweight, thin in thickness and low in power consumption, and is finding use in a wide field of application ranging from a small size device for computers or timepieces to a large size device such as a word processor or a personal computer.

From now on, use of the LCD as a display device for a portable information terminal or a personal data assist (PCD) is thought to be promising. In order for the LCD to be used as a display device for PCD, it is required to reduce the size and the weight of the device further and to reduce power consumption such as to enable driving for a prolonged time by e.g., an electric cell. As a display device capable of coping with these demands, a reflection type LCD is stirring up notice.

Among the reflective type LCDs, there is such a device employing two polarizer plates and a twist-nematic liquid crystal (TN liquid crystal) or a super-twist liquid crystal (STN liquid crystal). This reflection type LCD has a liquid crystal layer of the TN or STN liquid crystal sandwiched between two polarizer plates and a reflection plate on one side of the sandwiched structure.

Among the reflective type LCDs, there is also such a device employing a guest-host (GH) system. In this GH system, a two-color dyestuff (guest) is dissolved in a liquid crystal (host) and liquid crystal molecules are controlled in orientation by an electrical field to change the direction of orientation of dyestuff molecules simultaneously to utilize the change in light absorption due to dichroism in order to make display. This system, not in need of polarizer plates, may be exemplified by a phase change-GH system exploiting the phase transition, referred to hereinafter as a PC-GH system, a chiral nematic-GH system which has overcome the problem of hysteresis by exploiting the merit proper to the GH system, referred to hereinafter as the CN-GH system, an a-N*-GH system which randomly orients the liquid crystal to eliminate hysteresis to enable gradation representation, a $\lambda/4$-GH system employing a quarter wave plate, and a three-layer GH system having a three-layer liquid crystal layer structure of the GH system.

Of the above described reflection type reflection type liquid crystal display devices, that employing two polarizer plates reportedly is insufficient in lightness and difficult to design as a color type device because the incident light has to traverse the polarizer plates four times before exiting the device so that 70% of the incident light is absorbed by the polarizer plates without being used for display.

Conversely, the above-mentioned reflection type liquid crystal display device employing a sole polarizer plate can be improved in lightness by diminishing absorption by the polarizer plate.

With the above-mentioned reflection type liquid crystal display device of the GH system not employing the polarizer plate, lightness can similarly be assured.

The following Table 1 summarizes the properties of the reflection type liquid crystal display device employing the sole polarizer plate and the reflection type liquid crystal display device of the GH system not employing the polarizer plate.

TABLE 1

|  | mode | light-ness | con-trast | grada-tion | re-sponse speed | angle of visibi-lity | driving voltage |
|---|---|---|---|---|---|---|---|
| sole polar-izer plate | STN liquid crystal | Δ | ○ | ⊙ | Δ | Δ | up to 7V |
|  | TN liquid crystal | Δ | ⊙ | ⊙ | ⊙ | Δ | up to 3V |
|  | OCB liquid crystal | Δ | ⊙ | ⊙ | ⊙ | ○ | up to 3V |
| no polar-izer plate | PC-GH | ○ | ○ | Δ | ○ | ○ | up to 5V |
|  | CN-GH | ○ | ○ | ⊙ | ○ | ○ | up to 5V |
|  | a-N* GH | ○ | ○ | ⊙ | ○ | ○ | up to 5V |
|  | λ/4 GH | ○ | ○ | ⊙ | ⊙ | ○ | up to 5V |
|  | three-layer GH | ⊙ | ○ | ⊙ | Δ | Δ | up to 5V times 3 |

In Table 1, lightness, contrast, gradation, response speed and the angle of visibility are evaluated in three stages. Specifically, ⊙, ○ and Δ denote extremely satisfactory, satisfactory and acceptable, respectively.

As may be seen from Table 1, the reflection type liquid crystal display device of the GH system is extremely satisfactory in lightness, herein white color display. However, the GH system cannot be said to be sufficient in reliability of the component material.

It cannot be said that all characteristics can be met sufficiently with the remaining types of the reflection type liquid crystal display device.

Recently, with progress in the polarizer plates, a material superior to the conventional material in light transmittance and polarization has been developed. Thus, attention is directed to the reflection type liquid crystal display device employing a sole polarizer plate. Moreover, since the use of the STN liquid crystal enables simple matrix driving, attention is directed to a reflection type liquid crystal display device employing a sole polarizer plate and the STN liquid crystal. However, this reflection type liquid crystal display device achieves high contrast by twisting the array of the liquid crystal molecules by 180° to 270° such that it is not optimum in picture quality or response speed.

SUMMARY OF THE INVENTION

It is an therefore object of the present invention to provide a reflection type liquid crystal display device assuring bright white color display and high contrast and which achieves low power consumption as well as a picture quality and a response speed capable of accommodating a moving picture.

The present invention provides a reflection type liquid crystal display device including a first substrate having a transparent electrode on its inner surface, a second substrate having a plurality of pixel electrodes provided facing the transparent electrode and a plurality of switching elements for driving the pixel electrodes, the pixel electrodes being formed of a light reflecting material, a nematic liquid crystal layer arranged between the first and second substrates and a polarizing plate arranged outside of the first substrate.

Preferably, a phase difference film is arranged between the first substrate and the polarizing plate.

Preferably, the nematic liquid crystal layer is constituted by a negative type nematic liquid crystal exhibiting negative anisotropy.

Preferably, the pixel electrodes have a light-scattering function.

Preferably, the light-scattering function is provided by irregularities on the surfaces of the pixel electrodes.

Preferably, a light-scattering layer is provided outside the polarizing plate.

Preferably, the first substrate has a color filter.

Preferably, the second substrate has a color filter.

Preferably, the switching element is a thin-film transistor coated with an organic resin layer.

Preferably, the pixel electrodes are formed by metal layers formed on irregularities formed on the surface of the organic resin layer.

In the reflection type liquid crystal display device of the present invention, the nematic liquid crystal is preferably a negative type one exhibiting negative anisotropy. However, a positive type nematic liquid crystal exhibiting positive anisotropy may also be used.

In the reflection type liquid crystal display device of the present invention, the surfaces of the plural pixel electrodes facing the liquid crystal layer present surface irregularities of the order of a few $\mu$m in size.

If, in the reflection type liquid crystal display device of the present invention, the surfaces of the plural pixel electrodes facing the liquid crystal layer are devoid of surface irregularities of the order of a few $\mu$m in size, a light-scattering layer is preferably provided on the transparent substrate.

In the reflection type liquid crystal display device of the present invention, a color filter is preferably provided on the transparent substrate or on the facing side substrate.

In the reflection type liquid crystal display device of the present invention, the transparent substrate having the transparent electrode and the polarizer plate and the facing side substrate having the plural pixel electrodes of a light reflective material and plural switching elements for driving the pixel electrodes are arranged at a predetermined spacing in-between so that the transparent electrode and the plural pixel electrodes face each other. Thus, high contrast can be achieved by using a polarizer plate, and a bright white color display can be achieved by the reduced rate of absorption of the incident light by the sole polarizer plate.

Since the pixel electrodes are formed of a light reflective material so as to operate also as a reflective layer, there is formed a reflective layer in contact with the liquid crystal layer, thus assuring high picture quality due to elimination of the effect of parallax under which an inherent image is blurred by its shade.

Since the reflection type liquid crystal display device of the present invention is of the reflection type, power consumption is lowered. In addition, since the electrical voltage is applied along the direction of thickness of the liquid crystal layer, as in the case of the conventional thin film transistor (TFT) type liquid crystal display device, power consumption is further lowered.

If, in the reflection type liquid crystal display device of the present invention, the liquid crystal layer between the transparent substrate and the facing side substrate is formed of the negative type nematic liquid crystal material, in which the array of liquid crystal molecules is not twisted in distinction from the conventional TN or STN liquid crystal material, a high response speed and a small view angle dependency as well as a larger angle of visibility can be achieved, thus assuring high picture quality.

If, in the reflection type liquid crystal display device of the present invention, the surfaces of the plural pixel electrodes facing the liquid crystal layer present surface irregularities of the order of a few $\mu$m in size, the pixel electrodes operate not only as the reflective layer but also as a light-scattering layer, thus further increasing the angle of visibility.

On the other hand, if, in the reflection type liquid crystal display device of the present invention, the surfaces of the plural pixel electrodes facing the liquid crystal layer are devoid of surface irregularities of the order of a few $\mu$m in size, a light-scattering layer is preferably provided on the transparent substrate, in which case the angle of visibility can be increased further.

If, in the reflection type liquid crystal display device of the present invention, a color filter is provided on the transparent substrate or the facing side substrate, there is realized a reflection type liquid crystal display device for color display.

In the reflection type liquid crystal display device of the present invention, the transparent substrate having the transparent electrode and the polarizing plate and the facing side substrate having plural electrodes formed of a light reflective material and switching elements driving these pixel electrodes are arranged at a predetermined spacing in-between so that the transparent electrode and the pixel electrodes face each other. Since no polarizing plate is used, high contrast is achieved. Since there is provided a sole polarizing plate, the incident light is absorbed by the polarizing plate to a lesser extent, thus realizing display of bright white color.

Since the plural pixel electrodes are formed of a light reflective material, and hence also operate as a reflective layer, there is formed a reflective layer in contact with the liquid crystal layer thus assuring high picture quality by eliminating the effect of parallax in which an inherent picture is blurred by a shade.

In the reflection type liquid crystal display device of the present invention, low power consumption is achieved by applying the electrical voltage along the direction of thickness of the liquid crystal layer as in the case of the conventional thin film transistor (TFT) liquid crystal display device.

If, in the reflection type liquid crystal display device of the present invention, the liquid crystal layer between the transparent substrate and the facing side substrate is formed by a negative type nematic liquid crystal having negative anisotropy, high response speed, low angle of view dependency and large visibility angle can be achieved with high picture quality because the arrangement of the liquid crystal molecules is not twisted with the negative type nematic liquid crystal having negative anisotropy contrary to the conventional TN or STN liquid crystal.

If, in the reflection type liquid crystal display device of the present invention, the surfaces of the plural pixel electrodes towards the liquid crystal layer present surface irregularities several $\mu$m in size, the pixel electrodes operate not only as the reflective layers but also as the reflective layers, thus further increasing the angle of visibility.

If, in the reflection type liquid crystal display device of the present invention, the surfaces of the plural pixel electrodes towards the liquid crystal layer present no surface irregularities several μm in size, the transparent substrate is preferably provided with a light-scattering layer for further increasing the angle of visibility.

If, in the reflection type liquid crystal display device of the present invention, the transparent substrate or the facing side substrate is provided with ta color filter, a color display is achieved.

That is, a reflection type liquid crystal display device is provided in which bright white color display and a high contrast can be achieved to realize the response speed and high picture quality compatible with a moving picture.

DESCRIPTION OF THE PREFERRED EMBODIMENTS

Figure 1:
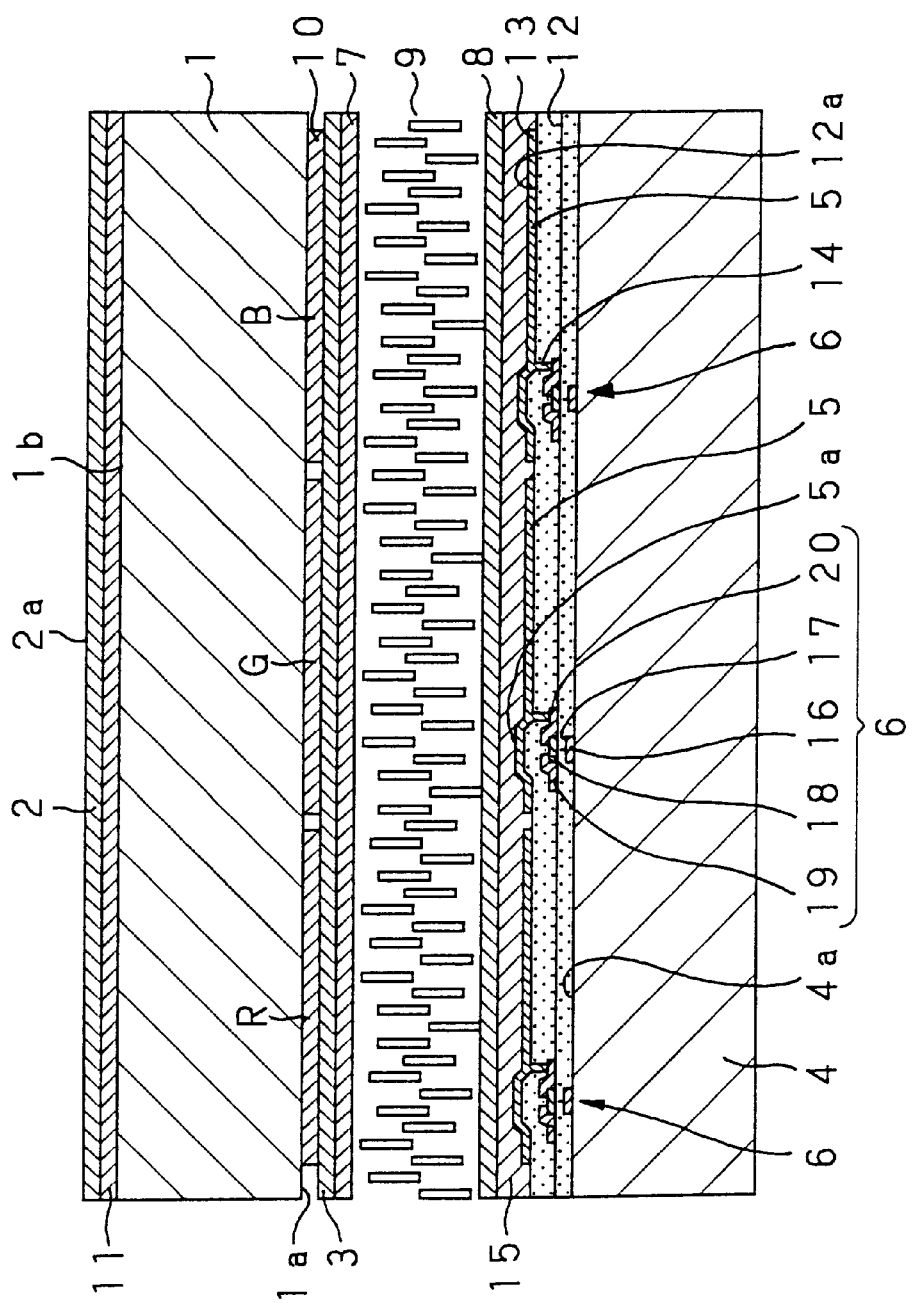
FIG. 1 is a schematic longitudinal cross-sectional view showing an illustrative structure of a reflection type liquid crystal display device according to the present invention.

Referring to the drawings, preferred illustrative embodiments of the present invention will be explained in detail.

A first embodiment of the reflection type liquid crystal display device according to the present invention is such a reflection type liquid crystal display device of the active matrix system having an enclosed micro-color filter.

The reflection type liquid crystal device includes a transparent substrate 1, and a facing side substrate 4, as shown in FIG. 1. The transparent substrate 1 includes a transparent electrode 3 on its major surface 1a and a polarizing plate 2 on the opposite major surface 1b. The facing side substrate 4 has, on its major surface 4a, a plurality of pixel electrodes 5 and a plurality of switching elements 6 adapted for driving these pixel electrodes 5. The transparent substrate 1 and the facing side substrate 4 are arranged facing each other at a predetermined distance in-between so that the transparent electrode 3 faces the pixel electrodes 5. A liquid crystal layer 9 is interposed between the transparent substrate 1 and the facing side substrate 4 so that the liquid crystal layer 9 is sandwiched between a pair of orientation films 7, 8 along the thickness direction.

The transparent substrate 1 is formed of a transparent substrate, such as glass, with the transparent electrode 3 being formed of ITO glass or IXO glass. A micro color filter 10 is arrayed between the transparent electrode 3 and the transparent substrate 1 towards the major surface 1a of the transparent substrate 1. The micro color filter 10 has R, G and B arrayed in stripes in association with the pixel electrodes 5, as shown in FIG. 1. A phase difference film 11 is arranged between the polarizing plate 2 towards the major surface 1b of the transparent substrate 1 and the transparent substrate 1. The polarizing plate 2 has its surface 2a processed for anti-glare effects in order to prevent wasteful reflection.

On the other hand, the switching elements 6 are formed on the major surface 4a of the facing side substrate 4, as described above, and the pixel electrodes 5 are formed so as to be connected to the switching elements 6. More specifically, the switching elements 6 are formed on the major surface 4a of the facing side substrate 4 and a resin layer 12 is formed covering these switching elements 6. On the resin layer 12 is formed a metal layer 13 having the pixel electrodes 5. The metal layer 13 is also formed in connection holes 14 bored in the resin layer 12 for interconnecting the pixel electrodes 5 and the switching elements 6. On the resulting assembly is formed a planarizing film 15.

In the present embodiment of the reflection type liquid crystal display device, the metal layer 13, having the pixel electrodes 5, is formed as a metal layer by vapor deposition of light-reflective metals, such as aluminum or silver. The pixel electrodes 5 also operate as a reflective film. On the metal layer 13 is formed a multi-layered dielectric layer, not shown, formed of $MgF_2$ (with a refractive index of 1.38) or ZnS (with a refractive index of 2.35), for increasing the reflection efficiency. The dielectric layer is layered so that a ZnS film, having a higher refractive index, is disposed as the uppermost layer.

Moreover, with the present embodiment of the reflection type liquid crystal display device, the resin layer 12 covering the switching elements 6 has its major surface 12a facing the metal layer 13 formed as a surface presenting surface irregularities. Thus, the metal layer 13 formed thereon also has surface irregularities, while the major surfaces 5a of the plural pixel electrodes 5 also have surface irregularities. That is, the pixel electrodes 5 also operate as a light-scattering layer.

The major surface 12a of the present resin layer 12 towards the metal layer 13 is processed with light exposure and development by a known lithographic technique and split into sections of a pre-set shape, such as columnar shape. The resin layer 12 is further treated by re-flow processing so that the major surface 12a is partially formed into substantially spherical sections to produce irregular surface having projections and recesses of several μm in size. Thus, the metal layer 13 also is formed with projections and recesses of several μm in size.

Moreover, when the present embodiment of the reflection type liquid crystal display device, the liquid crystal layer 9, sandwiched between the paired orientation films 7, 8 along the direction of thickness, is formed as a negative type nematic liquid crystal having negative anisotropy, such that, if an electrical voltage is applied across the pixel electrodes 5 and the transparent electrode 3, the liquid crystal molecules are oriented in a perpendicular direction relative to the in-plane direction of the transparent substrate 1 and the facing side substrate 4, whereas, if the electrical voltage is applied across the pixel electrodes 5 and the transparent electrode 3, the liquid crystal molecules are shifted to and oriented in the in-plane direction. The orientation films 7, 8 are of polyimide.

That is, in the present embodiment of the reflection type liquid crystal display device, the incident light from outside is converted by the polarizing plate 2 into linear polarized light, which then is incident on the liquid crystal layer 9. If there is no voltage applied across the liquid crystal layer 9, the linear polarized light reaches the pixel electrodes 5, as a reflecting layer, without undergoing double refraction, and is reflected by the surfaces of the pixel electrodes 5 to display white light. Since the present embodiment includes the micro color filter 10, the white light or light of various colors is displayed. On the other hand, if the voltage is applied across the liquid crystal layer 9, the linear polarized light incident on the liquid crystal layer 9 undergoes elliptical polarization due to the effect of double refraction such that the light reflected by the pixel electrodes 5 as the reflection layer is absorbed by the polarizer slate 2 to display the black color.

The switching elements 6 of the reflection type liquid crystal display device are formed by semiconductor transistors of the bottom gate structure in which a gate electrode 16 is formed on a major surface 4a of the substrate 4 and a gate insulating film 17 and a thin semiconductor film 18 formed of for example, polycrystal silicon, are layered thereon in this order. The channel area, in register with the gate electrode, is protected from above by a stop layer.

The thin semiconductor film 18 is partially covered by layers of a source electrode 19 and a drain electrode 20 formed by aluminum patterning.

The drain electrode 20 and the metal layer 13 are electrically interconnected by the via-hole 14 bored in the resin layer 13, as described above, so that the drain electrode 20 is of the same electrical potential as the metal layer 13. The source electrode 19 is similarly connected to outside by a via-hole, not shown, provided in the resin layer 12, so as to be supplied with a signal voltage, such as video signal voltage.

That is, in the present embodiment of the reflection type liquid crystal display device, the high contrast is achieved by using the polarizing plate 2. Moreover, the incident light is absorbed to a lesser extent by the sole polarizing plate 2, thus achieving display of the bright white color.

In addition, since the plural pixel electrodes 5 are formed of a light reflective material, and are adapted to operate as a reflective layer as well, the reflective layer is formed in contact with the liquid crystal layer 9, so that there is only negligible effect of parallax in which the inherent layer is blurred by a shade, and hence a high picture quality is achieved.

Meanwhile, in the present embodiment of the reflection type liquid crystal display device, power consumption is reduced not only by the device being of the reflection type but also by voltage application along the direction of thickness of the liquid crystal layer 9.

Also, in the present embodiment of the reflection type liquid crystal display device, since the liquid crystal layer 9 is formed by the negative type nematic liquid crystal having the above-mentioned negative anisotropy, in which the arrangement of the liquid crystal molecules is not twisted in distinction from that of the conventional TN or STN liquid crystal, a high response speed and a small viewing angle dependency as well as a large angle of visibility can be realized, thus improving the picture quality.

In the present embodiment of the reflection type liquid crystal display device, the major surface 12a towards the liquid crystal layer 9 of the metal layer 13 having the plural pixel electrodes 5 has irregularities of the order of several μm, so that these pixel electrodes 5 operate not only as the reflective layer but also as a scattering layer to further enlarge the angle of visibility.

On the other hand, in the present embodiment of the reflection type liquid crystal display device, color display may, of course, be achieved since the micro color filter 10 is provided on the transparent substrate 1.

Thus, in the present embodiment of the reflection type liquid crystal display device, low power consumption and the bright white color display as well as high contract can be achieved thus realizing a response speed and the picture quality compatible with a moving picture.

As a second embodiment of the present invention, another example of the reflection type liquid crystal display device of the active matrix system, having an enclosed micro color filter, is hereinafter explained.

Figure 2:
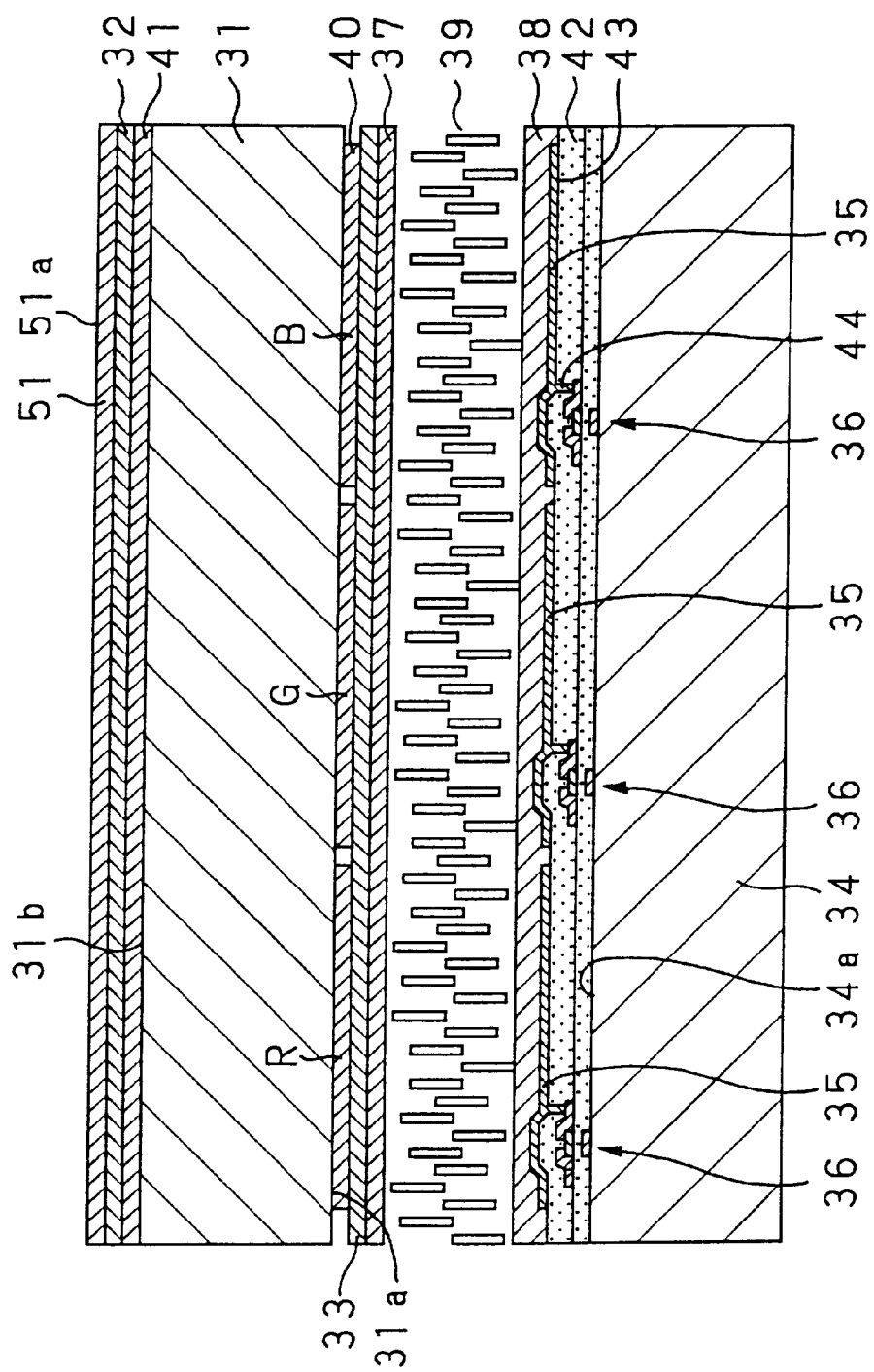
FIG. 2 is a schematic longitudinal cross-sectional view showing another illustrative structure of a reflection type liquid crystal display device according to the present invention.

The present embodiment of the reflection type liquid crystal display device is of a substantially similar structure to that of the above-described first embodiment. That is, the present embodiment of the reflection type liquid crystal display device includes a transparent substrate 31, and a facing side substrate 34, as shown in FIG. 2. The transparent substrate 31 includes a transparent electrode 33 on its major surface 31a and a polarizing plate 32 on the opposite major surface 31b. The facing side substrate 34 has, on its major surface 34a, a plurality of pixel electrodes 35 and a plurality of switching elements 36 adapted for driving these pixel electrodes 35. The transparent substrate 31 and the facing side substrate 34 are arranged facing each other at a predetermined distance in-between so that the transparent electrode 33 faces the pixel electrodes 35. A liquid crystal layer 39 is interposed between the transparent substrate 31 and the facing side substrate 34 so that the liquid crystal layer 39 is sandwiched between a pair of orientation films 37, 38 along the thickness direction.

The transparent substrate 31 and the transparent electrode 33 are formed of a material similar to that used in the first embodiment. A micro color filter 40 is arrayed between the transparent electrode 33 and the transparent substrate 31 towards the major surface 31a of the transparent substrate 31. The micro color filter 40 has R, G and B arrayed in stripes in association with the pixel electrodes 35, as shown in FIG. 2. A phase difference film 41 is arranged between the polarizing plate 32 towards the major surface 31b of the transparent substrate 31 and the transparent substrate 31.

On the other hand, the switching elements 36 are formed on the major surface 34a of the facing side substrate 34, as described above, and the pixel electrodes 35 are formed so as to be connected to the switching elements 36. More specifically, the switching elements 36 are formed on the major surface 34a of the facing side substrate 34 and a resin layer 42 is formed covering these switching elements 36. On the resin layer 42 is formed a metal layer 33 having the pixel electrodes 35. The metal layer 43 is also formed in connection holes 44 formed in the resin layer 42 for interconnecting the pixel electrodes 35 and the switching elements 36.

In the present embodiment of the reflection type liquid crystal display device, the metal layer 43, having the pixel electrodes 35, is formed as a metal layer formed by vapor deposition of light-reflective metals, such as aluminum or silver, such that the pixel electrodes 35 also operate as a reflective film. On the metal layer 43 is formed a multi-layer dielectric film, not shown, as in the above-described first embodiment.

In the present embodiment of the reflection type liquid crystal display device, in distinction from the above-described first embodiment, the surface of the metal layer 43 is not roughed, so that the orientation film 38 is directly deposited on the multi-layer dielectric film, not shown. For this reason, the metal layer 43 is not operating as a light-scattering layer. Instead, a light-scattering film 51 is arranged on the polarizing plate 32 of the transparent substrate 31 and has its surface 51a processed with anti-glare treatment in order to prevent wasteful light reflection. The light-scattering film 51 may be exemplified by, for example, SUMILITE (trade name) manufactured by SUMITOMO KAGAKU KK.

Moreover, with the present embodiment of the reflection type liquid crystal display device, the liquid crystal layer 39, sandwiched between the paired orientation films 37, 38 along the direction of thickness, is formed as a negative type nematic liquid crystal having negative anisotropy, such that, if an electrical voltage is not applied across the pixel electrodes 35 and the transparent electrode 33, the liquid crystal molecules are oriented in a perpendicular direction relative to the in-plane direction of the transparent substrate 1 and the facing side substrate 4, whereas, if the electrical voltage is applied across the pixel electrodes 35 and the transparent electrode 33, the liquid crystal molecules are shifted to and oriented in the in-plane direction. The orientation films 7, 8 are of polyimide.

That is, in the present embodiment of the reflection type liquid crystal display device, the incident light from outside is converted by the polarizing plate 32 into linear polarized light which then is incident on the liquid crystal layer 39. If there is no voltage applied across the liquid crystal layer 39, the linear polarized light reaches the pixel electrodes 35, as a reflecting layer, without undergoing double refraction, and is reflected by the surfaces of the pixel electrodes 35 to display white light. Since the present embodiment includes the micro color filter 40, the white light or light of other colors is displayed. On the other hand, if the voltage is applied across the liquid crystal layer 39, the linear polarized light incident on the liquid crystal layer 39 undergoes elliptical polarization due to the effect of double refraction such that the light reflected by the pixel electrodes 35 as the reflection layer is absorbed by the polarizer late 32 to display the black color.

Since the switching elements 36 of the present embodiment of the reflection type liquid crystal display device is formed by a semiconductor transistor of the bottom gate structure, and has a structure similar to that of the above-described first embodiment, it is not explained here specifically.

That is, since the present embodiment of the reflection type display device is configured similarly to the above-described first embodiment, high contrast and bright white color display can be achieved, as in the above-described first embodiment, while there is only negligible effect of parallax in which the inherent layer is blurred by a shade, thus achieving an enlarged angle of visibility and low power consumption as well as a high picture quality and high response speed.

Also, since the light-scattering filter 51 is provided on the transparent substrate 31 in the present embodiment of the display device, the angle of visibility can be increased further.

On the other hand, in the present embodiment of the reflection type liquid crystal display device, color display may, of course, be made as a result of using the micro color filter 10 provided on the transparent substrate 1.

Thus, in the present embodiment of the reflection type liquid crystal display device, low power consumption and the bright white color display as well as high contract can be achieved thus realizing a response speed and the picture quality compatible with a moving picture.

As a third embodiment of the present invention, another example of the reflection type liquid crystal display device of the active matrix system, having an enclosed micro color filter, is hereinafter explained.

Figure 3:
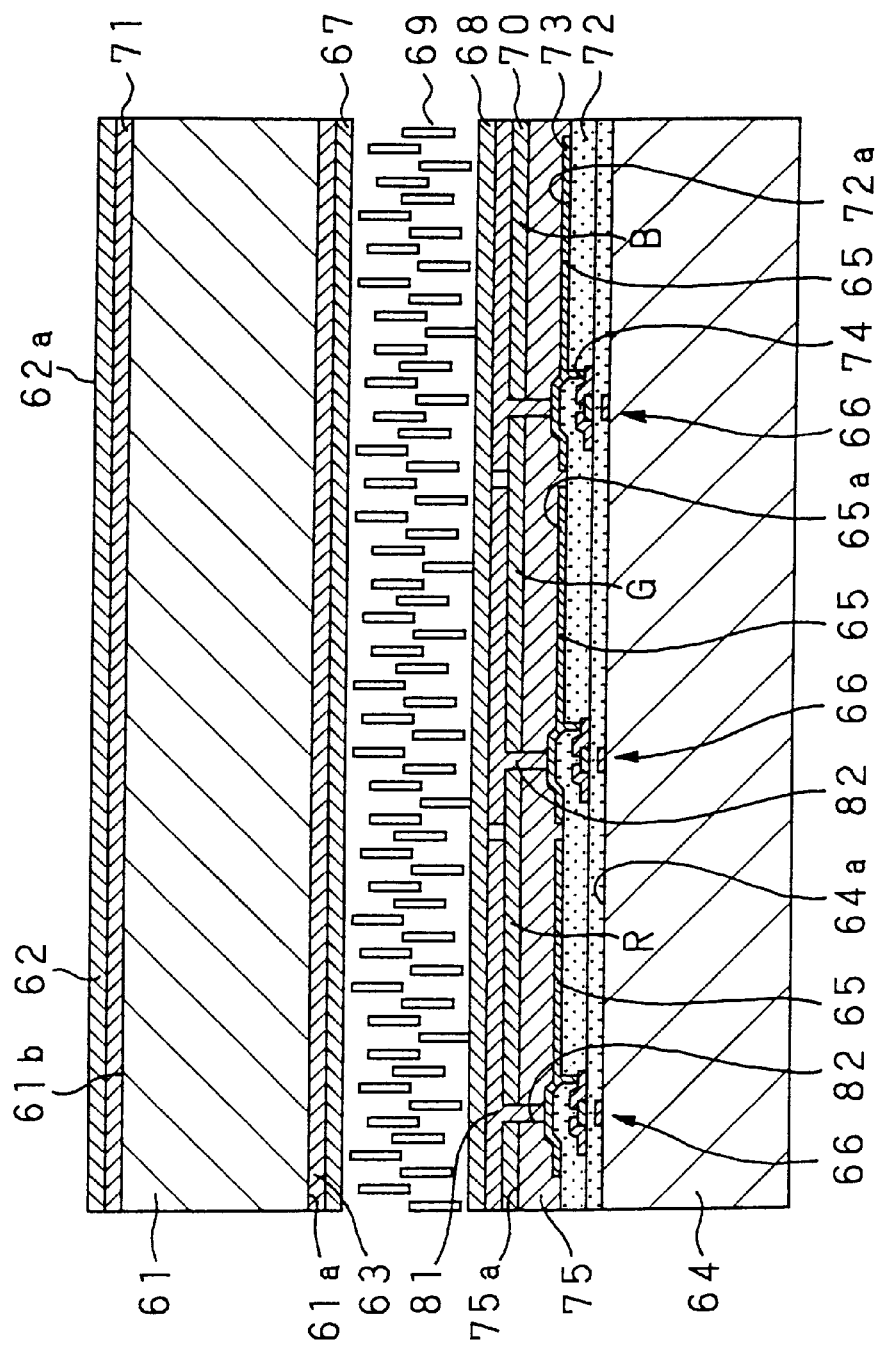
FIG. 3 is a schematic longitudinal cross-sectional view showing still another illustrative structure of a reflection type liquid crystal display device according to the present invention.

The present embodiment of the reflection type liquid crystal display device is of a substantially similar structure to that of the above-described first embodiment. That is, the present embodiment of the reflection type liquid crystal display device includes a transparent substrate 61, and a facing side substrate 64, as shown in FIG. 3. The transparent substrate 61 includes a transparent electrode 63 on its major surface 61a and a polarizing plate 62 on the opposite major surface 61b. The facing side substrate 64 has, on its major surface 64a, a plurality of pixel electrodes 65 and a plurality of switching elements 66 adapted for driving these pixel electrodes 65. The transparent substrate 61 and the facing side substrate 64 are arranged facing each other at a predetermined distance in-between so that the transparent electrode 63 faces the pixel electrodes 65. A liquid crystal layer 69 is interposed between the transparent substrate 61 and the facing side substrate 64 so that the liquid crystal layer 69 is sandwiched between a pair of orientation films 67, 68 along the thickness direction.

The transparent substrate 61 and the transparent electrode 63 are formed of a material similar to that used in the above-described first embodiment. A phase difference film 71 is interposed between the polarizing plate 62 towards the major surface 61b of the transparent substrate 61 and the transparent substrate 61. The polarizing plate 62 has its surface 62a processed with anti-glare treatment in order to prevent unneeded reflection.

On the other hand, the switching elements 66 are formed on the major surface 64a of the facing side substrate 64, as described above, and the pixel electrodes 65 are formed so as to be connected to the switching elements 66. More specifically, the switching elements 66 are formed on the major surface 64a of the facing side substrate 64 and a resin layer 72 is formed covering these switching elements 66. On the resin layer 72 is formed a metal layer 73 having the pixel electrodes 65. The metal layer 73 is also formed in connection holes 74 formed in the resin layer 72 for interconnecting the pixel electrodes 65 and the switching elements 66. On the resulting assembly is formed a planarizing film 75.

In the present embodiment of the reflection type liquid crystal display device, the metal layer 73 having the pixel electrodes 65 are formed as metal layers by vapor deposition of a light-reflecting material, such as aluminum or silver, so that the pixel electrodes 65 also operate as the reflective films. On the metal layer 73 is formed a multi-layer dielectric film as in the above-described first embodiment.

Moreover, with the present embodiment of the reflection type liquid crystal display device, the resin layer 72 covering the switching elements 76 has its major surface 72a facing the metal layer 73 formed as an irregular surface. Thus, the metal layer 73 formed thereon also has an irregular surface, while the plural pixel electrodes 65 also have irregular major surfaces 65a facing the liquid crystal layer 69. That is, the pixel electrodes 65 also operate as a light-scattering layer.

The resin layer 72 is further treated by the same technique as in the first embodiment so that its major surface 72a is partially formed into substantially spherical sections to produce an irregular surface having projections and recesses of several $\mu$m in size. Thus, the metal layer 73 also has projections and recesses of several $\mu$m in size.

Also, with the present embodiment of the reflection type liquid crystal display device, a micro color filter 70 is arranged on the major surface 75a towards the liquid crystal layer 69 of the planarizing film 75. This micro color filter 70 has R, G and B which are arranged in stripes in association with the pixel electrodes 65 as shown in FIG. 3.

With the present embodiment of the reflection type liquid crystal display device, there is formed on the micro color filter 70 a transparent electrode 81 connected to the pixel electrodes 65 and which are associated with the pixel electrodes 65. Specifically, there are formed connection holes 82 traversing the micro color filter 70 and the planarizing film 75 and the transparent electrode 81 is formed in these connection holes as well to interconnect the transparent electrode 81 and the pixel electrodes 65.

Moreover, with the present embodiment of the reflection type liquid crystal display device, the liquid crystal layer 69, sandwiched between the paired orientation films 67, 68 along the direction of thickness, is formed as a negative type nematic liquid crystal having negative anisotropy, such that, if an electrical voltage is not applied across the pixel electrodes 65 and the transparent electrode 63, the liquid crystal molecules are oriented in a perpendicular direction relative to the in-plane direction of the transparent substrate 61 and the facing side substrate 64, whereas, if the electrical voltage is applied across the pixel electrodes 65 and the transparent electrode 63, the liquid crystal molecules are shifted to and oriented in the in-plane direction.

That is, in the present embodiment of the reflection type liquid crystal display device, the incident light from outside is converted by the polarizing plate 62 into linear polarized light which then is incident on the liquid crystal layer 69. If there is no voltage applied across the liquid crystal layer 69, the linear polarized light reaches the pixel electrodes 65, as a reflecting layer, without undergoing double refraction, and is reflected by the surfaces of the pixel electrodes 65 to display white light. Since the present embodiment includes the micro color filter 70, the white light or light of various other colors is displayed. On the other hand, if the voltage is applied across the liquid crystal layer 69, the linear polarized light incident on the liquid crystal layer 69 undergoes elliptical polarization due to the effect of double refraction such that the light reflected by the pixel electrodes 65 as the reflection layer is absorbed by the polarizer late 62 to display the black color.

Since the switching elements 66 of the present embodiment of the reflection type liquid crystal display device is formed by a semiconductor transistor of the bottom gate structure, and has a structure similar to that of the above-described first embodiment, it is not explained here specifically.

That is, since the present embodiment of the reflection type display device is configured similarly to the above-described first embodiment, high contrast and bright white color display can be achieved, as in the above-described first embodiment, while there is only negligible effect of parallax in which the inherent layer is blurred by a shade, thus achieving an enlarged angle of visibility and low power consumption as well as a high picture quality and high response speed.

Also, since the light-scattering filter 51 is provided on the transparent substrate 31 in the present embodiment of the display device, the angle of visibility can be increased further.

On the other hand, in the present embodiment of the reflection type liquid crystal display device, color display may, of course, be made due to the micro color filter 10 provided on the transparent substrate 1.

Thus, in the present embodiment of the reflection type liquid crystal display device, low power consumption and the bright white color display as well as high contract can be achieved thus realizing a response speed and the picture quality compatible with a moving picture.

As a fourth embodiment of the present invention, another example of the reflection type liquid crystal display device of the active matrix system, having an enclosed micro color filter, is hereinafter explained.

Figure 4:
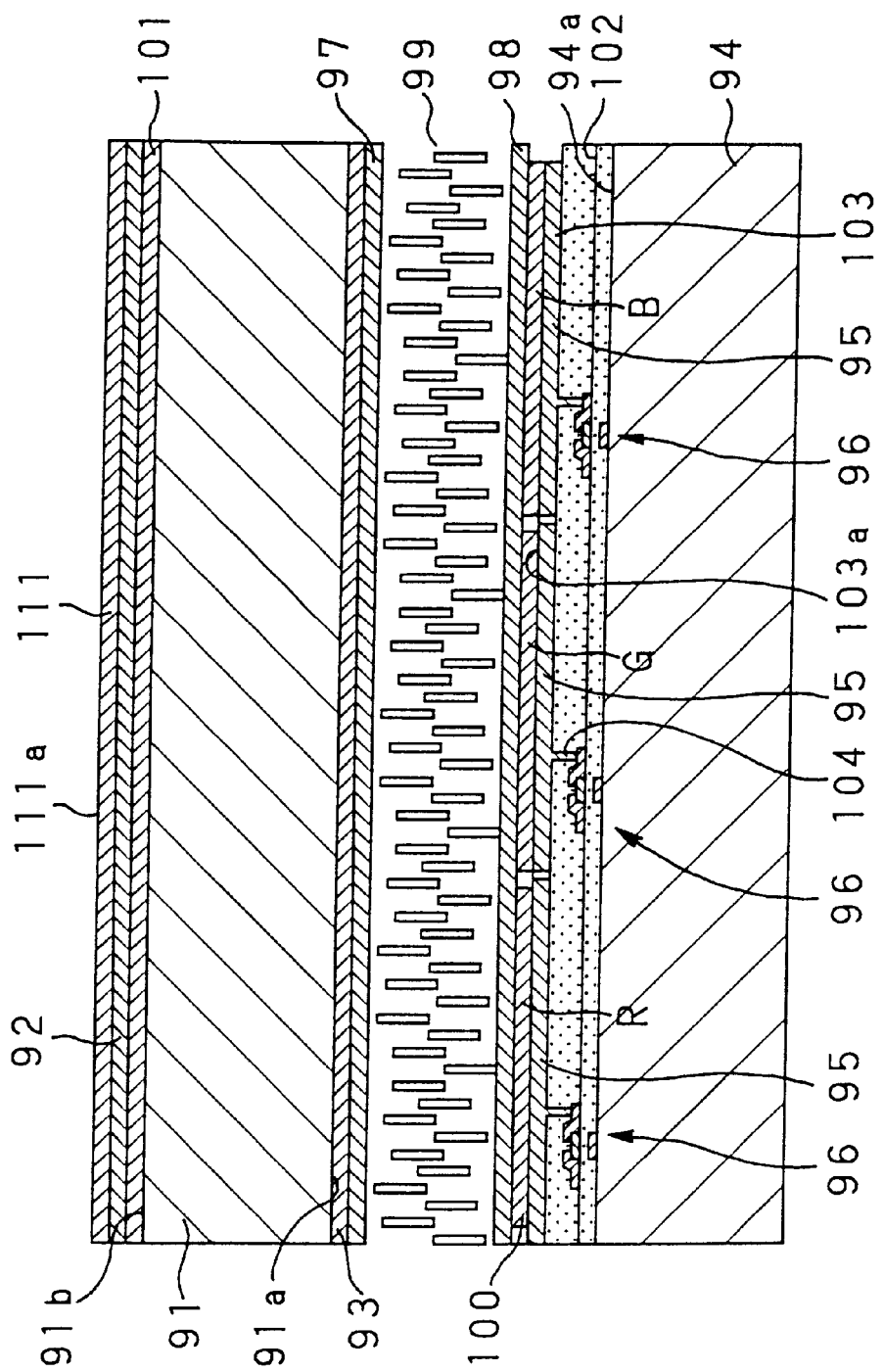
FIG. 4 is a schematic longitudinal cross-sectional view showing yet another illustrative structure of a reflection type liquid crystal display device according to the present invention.

The present embodiment of the reflection type liquid crystal display device is of a substantially similar structure to that of the above-described first embodiment. That is, the present embodiment of the reflection type liquid crystal display device includes a transparent substrate 91, and a facing side substrate 94, as shown in FIG. 4. The transparent substrate 91 includes a transparent electrode 93 on its major surface 91a and a polarizing plate 92 on the opposite major surface 91b. The facing side substrate 94 has, on its major surface 94a, a plurality of pixel electrodes 95 and a plurality of switching elements 96 adapted for driving these pixel electrodes 95. The transparent substrate 91 and the facing side substrate 94 are arranged facing each other at a predetermined distance in-between so that the transparent electrode 93 faces the pixel electrodes 95. A liquid crystal layer 99 is interposed between the transparent substrate 91 and the facing side substrate 94 so that the liquid crystal layer 99 is sandwiched between a pair of orientation films 97, 98 along the thickness direction.

The transparent substrate 91 and the transparent electrode 93 are formed of a material similar to that used in the above-described first embodiment. There is arranged a phase difference film 101 between the polarizing plate 92 towards the major surface 91b of the transparent substrate 91 and the transparent substrate 91. Specifically, the switching elements 96 are formed on the major surface 94a of the facing side substrate 94 and a resin layer 102 is formed covering these switching elements 96. On the resin layer 102 is formed a metal layer 103 having the pixel electrodes 95. The metal layer 103 is also formed in connection holes 104 formed in the resin layer 102 to interconnect the pixel electrodes 95 and the switching elements 96. On the resulting assembly is formed a planarizing film 95.

In the present embodiment of the reflection type liquid crystal display device, the metal layer 103 having the pixel electrodes 95 are formed as metal layers by vapor deposition of a light-reflecting material, such as aluminum or silver, so that the pixel electrodes 95 also operate as the reflective films. On the metal layer 103 is formed a multi-layer dielectric film as in the above-described first embodiment.

In the present embodiment of the reflection type liquid crystal display device, in distinction from the above-described first embodiment, the surface of the metal layer 103 is not a roughed surface, such that the metal layer 103 is not operating as a light-scattering layer. Instead, a light-scattering film 111 is arranged on the polarizing plate 92 of the transparent substrate 91 and has its surface 111a processed with anti-glare treatment in order to prevent wasteful light reflection. The light-scattering film 111 may be exemplified by, for example, SUMILITE (trade name) manufactured by SUMITOMO KAGAKU KK. This light-scattering film 111 may be arranged between the polarizing plate 92 and the phase difference film 101.

Also, with the present embodiment of the reflection type liquid crystal display device, a micro color filter 100 is arranged on the major surface 103a towards the liquid crystal layer 99 of the metal layer 103. This micro color filter 100 has R, G and B which are arranged in stripes in association with the pixel electrodes 65 as shown in FIG. 4. On the micro color filter 100 is arranged an orientation film 98.

Moreover, with the present embodiment of the reflection type liquid crystal display device, the liquid crystal layer 99, sandwiched between the paired orientation films 97, 98 along the direction of thickness, is formed as a negative type nematic liquid crystal having negative anisotropy, such that, if an electrical voltage is not applied across the pixel electrodes 95 and the transparent electrode 93, the liquid crystal molecules are oriented in a perpendicular direction relative to the in-plane direction of the transparent substrate 91 and the facing side substrate 94, whereas, if the electrical voltage is applied across the pixel electrodes 65 and the transparent electrode 63, the liquid crystal molecules are shifted to and oriented in the in-plane direction.

That is, in the present embodiment of the reflection type liquid crystal display device, the incident light from outside is converted by the polarizing plate 92 into linear polarized light which then is incident on the liquid crystal layer 99. If there is no voltage applied across the liquid crystal layer 99, the linear polarized light reaches the pixel electrodes 95, as a reflecting layer, without undergoing double refraction, and is reflected by the surfaces of the pixel electrodes 95 to display white light. Since the present embodiment includes the micro color filter 100, the white light or light of various other colors is displayed. On the other hand, if the voltage is applied across the liquid crystal layer 99, the linear polarized light incident on the liquid crystal layer 99 undergoes elliptical polarization due to the effect of double refraction such that the light reflected by the pixel electrodes 95 as the reflection layer is absorbed by the polarizer late 92 to display the black color.

Since the switching elements 96 of the present embodiment of the reflection type liquid crystal display device is formed by a semiconductor transistor of the bottom gate structure, and has a structure similar to that of the above-described first embodiment, it is not explained here specifically.

That is, since the present embodiment of the reflection type display device is configured similarly to the above-described first embodiment, high contrast and bright white color display can be achieved, as in the above-described first embodiment, while there is only negligible effect of parallax in which the inherent layer is blurred by a shade, thus achieving an enlarged angle of visibility and low power consumption as well as a high picture quality and high response speed.

Also, since the light-scattering filter 111 is provided on the transparent substrate 91 in the present embodiment of the display device, the angle of visibility can be increased further.

On the other hand, in the present embodiment of the reflection type liquid crystal display device, color display may, of course, be achieved because the micro color filter 110 is provided on the facing side substrate 94.

Thus, in the present embodiment of the reflection type liquid crystal display device, low power consumption and the bright white color display as well as high contract can be achieved thus realizing a response speed and the picture quality compatible with a moving picture.

In the above-described embodiments, the micro color filters are formed of an electrically non-conductive material. Recently, a color filter exhibiting electrical conductivity is commercialized. If this micro color filter is used, the micro color filter can simultaneously be used as a transparent electrode in the case of the reflection type liquid crystal display device in which the micro color filter is in contact with the transparent electrode.

Although the liquid crystal layer is formed by a negative type nematic liquid crystal exhibiting negative anisotropy, this liquid crystal layer may also be formed by a positive type nematic liquid crystal exhibiting positive anisotropy.

What is claimed is:

1. A reflective type liquid crystal display device comprising:
   a first substrate having a transparent electrode on its inner surface;
   a second substrate having a plurality of pixel electrodes provided facing the transparent electrode and a plurality of switching elements respectively connected to said plurality of pixel electrodes for driving said pixel electrodes, said pixel electrodes being formed of a light reflecting material and each having at least a portion thereof disposed over corresponding switching elements and arranged between the switch elements and the first substrate wherein the at least a portion of the pixel electrodes disposed over corresponding switching elements have surface irregularities due to disposal over the switching elements;
   a nematic liquid crystal layer arranged between said first and second substrates; and
   a polarizing plate arranged outside of said first substrate.

2. The reflection type liquid crystal display device according to claim 1 wherein a phase difference film is arranged between said first substrate and the polarizing plate.

3. The reflection type liquid crystal display device according to claim 1 wherein said nematic liquid crystal layer is constituted by a negative type nematic liquid crystal exhibiting negative anisotropy.

4. The reflection type liquid crystal display device according to claim 1 wherein said pixel electrodes have a light-scattering function.

5. The reflection type liquid crystal display device according to claim 4 wherein said light-scattering function is provided by irregularities on the surfaces of the pixel electrodes.

6. The reflection type liquid crystal display device according to claim 1 wherein a light-scattering layer is provided outside said polarizing plate.

7. The reflection type liquid crystal display device according to claim 1 wherein said first substrate has a color filter.

8. The reflection type liquid crystal display device according to claim 1 wherein said second substrate has a color filter.

9. The reflection type liquid crystal display device according to claim 1 wherein said switching element is a thin-film transistor coated with an organic resin layer.

10. The reflection type liquid crystal display device according to claim 9 wherein said pixel electrodes are formed by metal layers formed on irregularities formed on the surface of said organic resin layer.

11. The reflection type liquid crystal display device according to claim 1, further comprising:
    a second transparent electrode arranged between the nematic liquid crystal layer and the plurality of pixel electrodes.

12. The reflection type liquid crystal display device according to claim 11, further comprising:
    a planarizing film disposed between the second transparent electrode and the plurality of pixel electrodes.

* * * * *